US 11,939,762 B2

(12) United States Patent
Turnquist et al.

(10) Patent No.: US 11,939,762 B2
(45) Date of Patent: Mar. 26, 2024

(54) SYSTEM AND METHOD FOR MANUFACTURING A TOWER STRUCTURE

(71) Applicant: General Electric Company, Schenectady, NY (US)

(72) Inventors: Norman Arnold Turnquist, Carlisle, NY (US); Gregory Edward Cooper, Greenfield Center, NY (US); Xiaopeng Li, Niskayuna, NY (US); Christopher James Kenny, Schoharie, NY (US); Biao Fang, Clifton Park, NY (US); Pascal Meyer, Burnt Hills, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 357 days.

(21) Appl. No.: 17/241,553

(22) Filed: Apr. 27, 2021

(65) Prior Publication Data
US 2022/0341152 A1  Oct. 27, 2022

(51) Int. Cl.
*E04B 1/16* (2006.01)
*B33Y 30/00* (2015.01)
*B33Y 80/00* (2015.01)
*F03D 13/20* (2016.01)

(52) U.S. Cl.
CPC ............. *E04B 1/166* (2013.01); *B33Y 30/00* (2014.12); *B33Y 80/00* (2014.12); *F03D 13/20* (2016.05); *F05B 2240/912* (2013.01)

(58) Field of Classification Search
CPC ........ E04B 1/166; B33Y 30/00; B33Y 80/00; E04H 12/12; E04H 12/341
USPC .................................................... 52/651.01
See application file for complete search history.

(56) References Cited

U.S. PATENT DOCUMENTS

| 3,516,129 A | | 6/1970 | Yoder | |
|---|---|---|---|---|
| 3,987,593 A | * | 10/1976 | Svensson | ................ E01F 9/631 52/843 |
| 4,738,058 A | * | 4/1988 | Svensson | ................ F21V 21/10 52/843 |
| 6,938,392 B2 | * | 9/2005 | Fouad | ..................... E04H 12/12 52/223.4 |

(Continued)

FOREIGN PATENT DOCUMENTS

| CN | 202023701 U | | 11/2011 | |
|---|---|---|---|---|
| CN | 103161349 A | * | 6/2013 | ............. E01D 19/02 |

(Continued)

OTHER PUBLICATIONS

The European Search Report for EP application No. 22170046.1, dated Sep. 28, 2022.

(Continued)

*Primary Examiner* — Brent W Herring
(74) *Attorney, Agent, or Firm* — Dority & Manning, P.A.

(57) ABSTRACT

A system and method are provided for manufacturing a tower structure. Accordingly, one or more layers of a wall element are deposited with a printhead assembly. At least one recess is defined in the wall element. The recess(es) has a single, circumferential opening positioned along an inner reference curve or an outer reference curve of the wall element. The recess(es) also has a depth which extends in a radial direction and intersects a midline reference curve. A reinforcing element is placed entirely within the recess(es) at the midline reference curve.

11 Claims, 11 Drawing Sheets

(56) References Cited

U.S. PATENT DOCUMENTS

| | | | |
|---|---|---|---|
| 7,116,282 B2 * | 10/2006 | Trankina | E04H 12/2292 52/98 |
| 7,452,196 B2 | 11/2008 | Khoshnevis | |
| 8,024,908 B2 * | 9/2011 | Williams | E04H 12/02 D25/123 |
| 8,359,798 B2 | 1/2013 | Armbrecht et al. | |
| 8,778,479 B2 | 7/2014 | Bech | |
| 9,331,534 B2 | 5/2016 | Yost | |
| 10,260,480 B2 | 4/2019 | Beramendi Ortega et al. | |
| 10,513,833 B2 | 12/2019 | Phuly | |
| 10,543,617 B2 | 1/2020 | Grivetti et al. | |
| 2007/0181767 A1 | 8/2007 | Wobben | |
| 2007/0266670 A1 * | 11/2007 | Williams | E04H 12/02 52/843 |
| 2012/0159785 A1 | 6/2012 | Pyles et al. | |
| 2015/0300036 A1 | 10/2015 | Khoshnevis | |
| 2017/0016244 A1 | 1/2017 | Keller et al. | |
| 2017/0305034 A1 | 10/2017 | Grivetti et al. | |
| 2018/0171575 A1 | 6/2018 | Prusty et al. | |
| 2019/0226174 A1 | 7/2019 | Schuldt et al. | |
| 2019/0292803 A1 * | 9/2019 | Meyer | B33Y 70/00 |

FOREIGN PATENT DOCUMENTS

| | | | | |
|---|---|---|---|---|
| CN | 104328845 B | | 3/2017 | |
| CN | 104453014 B | | 4/2017 | |
| CN | 110273571 A | * | 9/2019 | E04B 1/642 |
| EP | 2064393 B1 | | 7/2012 | |
| EP | 1711328 B1 | | 3/2013 | |
| KR | 101754961 B1 | * | 7/2017 | B29C 70/30 |
| KR | 102075170 B1 | | 2/2020 | |
| WO | WO2016/055222 A1 | | 4/2016 | |
| WO | WO2017/092766 A1 | | 6/2017 | |
| WO | WO2019190956 A1 | | 10/2019 | |
| WO | WO2020068116 A1 | | 4/2020 | |
| WO | WO2021101558 A1 | | 5/2021 | |

OTHER PUBLICATIONS

U.S. Appl. No. 16/951,011 filed Nov. 18, 2020.
APIS COR, Laying Down Framework and Walls, Apr. 6, 2016. (Weblink Only) https://www.youtube.com/watch?v=ViqzfpW6TFo.
Bos et al., Experimental Exploration of Metal Cable as Reinforcement in 3D Printed Concrete, MDPI, Journals, Materials, vol. 10, Issue 11, 2017, 1314, 22 Pages. https://doi.org/10.3390/ma10111314.
Cowan, The World's First Family to Live in a 3D-Printed Home, BBC News, Jul. 5, 2018, 12 Pages. Retrieved on Sep. 1, 2020 from: https://www.bbc.com/news/technology-44709534.
FHWA, Chapter 8—Rebar Cages, Drilled Shafts: Construction Procedures by FHWA, PileBuck, Jun. 29, 2016, 11 Pages. http://www.pilebuck.com/drilled-shafts-construction-procedures-fhwa/chapter-8-rebar-cages/.
Gosselin et al., Large-Scale 3D-Printing of Ultra-High Performance Concrete—A New Processing Route for Architects and Builders, ScienceDirect, Materials & Design, vol. 100, No. 15, Jun. 15, 2016, pp. 102-109.
Irving, 3D Printed Reinforced Concrete Bridge Opens in the Netherlands, New Atlas, Architecture, Oct. 17, 2017, 8 Pages. https:/newatlas.com/3d-printed-concrete-bridge/51796/.
Marijnissen et al, 3D Concrete Printing in Architecture: A research on the potential benefits of 3D Concrete Printing in Architecture, Material Studies—Methodologies, vol. 2—eCAADe35, pp. 299-308. http://papers.cumincad.org/data/works/att/ecaade2017_087.pdf.
Mechtcherine et al., 3D-Printed Steel Reinforcement for Digital Concrete Construction—Manufacture, Mechanical Properties and Bond Behaviour, ScienceDirect, Construction and Building Materials, vol. 179, No. 10, Aug. 10, 2018, pp. 125-137. (Abstract Only) https://doi.org/10.1016/j.conbuildmat.2018.05.202.
Molitch-Hou, 400-Square-Meter Villa 3D Printed Onsite in Just 45 Days, Engineering.com, 3D Printing, Jun. 2016. (Weblink Only) https://www.engineering.com/3DPrinting/3DPrintingArticles/ArticleID/12415/400-Square-Meter-Villa-3D-Printed-Onsite-in-Just-45-Days.
Zareiyan et al., Effects of Interlocking on Interlayer Adhesion and Strength of Structures in 3D Printing of Concrete, ScienceDirect, Automation in Construction, vol. 83, Nov. 2017, pp. 212-221. https://www.researchgate.net/publication/319162312_Effects_of_interlaying_on_interlayer_adhesion_and_strength_of_structures_in_3D_printing of concrete.

* cited by examiner

SYSTEM AND METHOD FOR MANUFACTURING A TOWER STRUCTURE

FIELD

The present disclosure relates in general to tower structures, and more particularly to systems and methods for additively manufacturing a tower structures, such as for supporting wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

Tower structures, and in particular wind turbine towers, are often constructed of steel tubes, pre-fabricated concrete sections, or combinations thereof. Further, the tubes and/or concrete sections are typically formed off-site, shipped on-site, and then arranged together to erect the tower. For example, one manufacturing method included forming pre-cast concrete rings, shipping the rings to the site, arranging the rings atop one another, and then securing the rings together. As tower heights increase, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting and/or welding. Such methods, however, require extensive labor and can be time-consuming.

Thus, the art is continuously seeking new and improved methods for manufacturing towers. Accordingly, the present disclosure is directed to systems and methods for manufacturing towers that address the aforementioned issues. In particular, the present disclosure is directed to methods for additively manufacturing the tower structures on-site using automated additive printing devices mounted to a vertical support structure.

BRIEF DESCRIPTION

Aspects and advantages of the invention will be set forth in part in the following description, or may be obvious from the description, or may be learned through practice of the invention.

In one aspect, the present disclosure is directed to a method for manufacturing a tower structure. The method may include depositing one or more layers of a wall element with a printhead assembly, the wall element circumscribing a vertical axis of the tower structure. The wall element may have an outer circumferential face defining an outer reference curve, an inner circumferential face defining an inner reference curve, and a midline reference curve which is equidistant between the outer reference curve and the inner reference curve. The method may also include defining at least one recess of the wall element. The recess(es) may have a single, circumferential opening positioned along the inner reference curve or the outer reference curve and a depth extending in a radial direction. The depth may intersect the midline reference curve. Additionally, the method may include placing a reinforcing element entirely within the recess(es) at the midline reference curve.

In another aspect, the present disclosure is directed to an additively-manufactured tower structure. The tower structure may include a wall element circumscribing a vertical axis of the tower structure. The wall element may have an outer circumferential face defining an outer reference curve, an inner circumferential face defining an inner reference curve, and a midline reference curve which is equidistant between the outer reference curve and the inner reference curve. The tower structure may also include at least one recess defined by the wall element. The recess(es) may have a single, circumferential opening positioned along the inner reference curve or the outer reference curve and a depth extending in a radial direction, with the depth intersecting the midline reference curve. Additionally, the tower structure may include a reinforcing element placed entirely within the recess(es) at the midline reference curve.

In an additional aspect, the present disclosure is directed to an additive printing device for manufacturing a tower structure. The tower structure may include a wall element circumscribing a vertical axis of the tower structure. The wall element may have an outer circumferential face defining an outer reference curve, an inner circumferential face defining an inner reference curve, and a midline reference curve which is equidistant between the outer reference curve and the inner reference curve. The additive printing device may include a support structure, a materials ply assembly, and a printhead assembly operably coupled to the support structure. The printhead assembly may define a printhead axis which is parallel to the vertical axis. The printhead axis may be aligned with the midline reference curve during the additive printing of the wall element. The printhead assembly may include a printhead configured to deposit one or more layers of the wall element. The printhead may include a supply coupling operably coupling the printhead to the material supply for the receipt of a cementitious material therefrom. The printhead may also include a deposition nozzle defining a deposition orifice. The deposition orifice may circumscribe the printhead axis and may be oriented orthogonal to the printhead axis. The deposition orifice may have a fixed shape and a fixed print path centered on the midline reference curve when employed to additively print the tower structure. Additionally, the printhead may include a translatable flow-directing element positioned within the deposition nozzle between the supply coupling and the deposition orifice. The translatable flow-directing element may facilitate the establishment of a deposition footprint of the cementitious material while the position of the deposition orifice is maintained orthogonal to the printhead axis and centered on the midline reference curve. The deposition footprint may be established at at least one radial position which is offset from the midline reference curve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
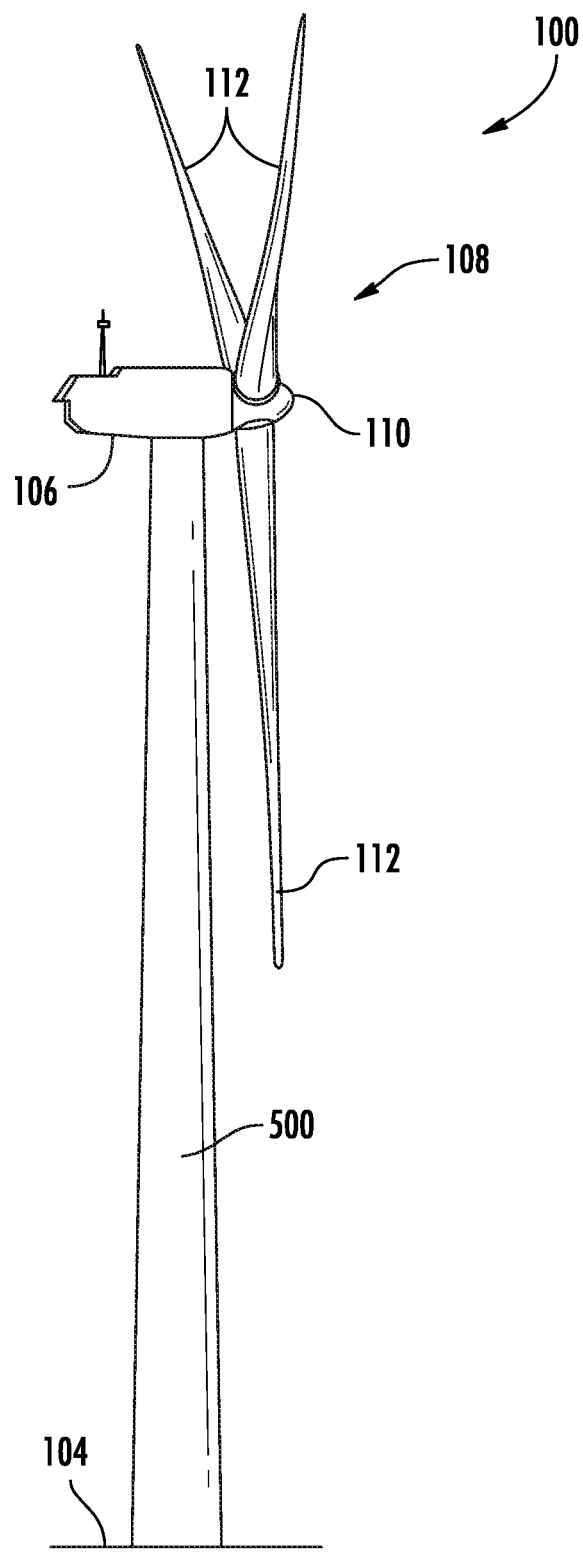
FIG. 1 illustrates a perspective view of one embodiment of a tower structure supporting a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to an additive printing device and methods for manufacturing a tower structure, such as a wind turbine tower. In particular, the present disclosure may include defining at least one recess in an inner and/or an outer face of a wall element of the tower structure. The recess(es) may be sized to have a depth which extends to a point beyond a midline reference curve. This depth may facilitate the positioning of a reinforcing element, such as a post-tension cable, entirely within the recess at the midline reference curve.

By placing the reinforcing element at the midline curve, a compressive force generated by the reinforcing element may be more evenly distributed across a thickness of the wall element then may be possible when the reinforcing element is displaced from the midline reference curve. It should be appreciated that a compressive force generated at a distance from the midline reference curve may create a moment within the wall element. In order to counter the moment generated by the displaced compressive force, additional reinforcing elements and/or structural components may be required in order to achieve a desired strength of the tower structure. This may, in turn, increase the cost and/or complexity of the tower structure and may limit the possible form factors of the tower structure. Accordingly, placing the reinforcing elements at the midline curve may preclude and/or mitigate the effects of the displaced compressive load and may, therefore, be beneficial in the manufacturing of the tower structure.

Additionally, the present disclosure may include additively printing the wall element via a printhead assembly of an additive printing device. The printhead assembly may include a deposition nozzle and a translatable flow-directing element positioned within the deposition nozzle. The translatable flow-directing element may be configured to alter an internal shape of the deposition nozzle while the deposition nozzle remains in a fixed orientation. In such an embodiment, the deposition nozzle may be aligned with the midline reference curve and may remain aligned with the midline reference curve throughout the printing process. In such a configuration, the translatable flow-directing element may dictate the radial position of the deposition footprint. In other words, the printhead assembly and the deposition nozzle may follow a circular print path at a fixed distance from the vertical axis of the tower structure. In such an embodiment, the translatable flow-directing element may modify the axial location of the deposition footprint in order to form the wall element. For example, the translatable flow-directing element may include a number of flaps or other structures which may be articulated to change the internal shape of the deposition nozzle. By changing the internal shape of the deposition nozzle, the flow of the cementitious material may be directed away from the vertical (e.g., displaced radially from the vertical axis of the printhead assembly). It should be appreciated that modifying the radial positioning of the deposition footprint without necessitating a corresponding radial movement of the printhead assembly and deposition nozzle may increase the print speed of the additive printing device.

Referring now to the drawings, FIG. 1 illustrates a perspective view of an embodiment of a tower structure 500 according to the present disclosure. As depicted in FIG. 1, the tower structure may be a component of a wind turbine 100. As shown, the wind turbine 100 generally includes a tower structure 500 extending from a support surface 104, a nacelle 106, mounted on the tower structure 500, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

It should be appreciated that while discussed herein in reference to a wind turbine tower, the present disclosure is not limited to wind turbine towers but may be utilized in any application having concrete construction and/or tall tower structures. For example, the present disclosure may be utilized in the additive manufacturing of homes, buildings, portions of buildings, bridges, towers, poles, and other aspects of the concrete industry. Further, the methods described herein may also apply to manufacturing any similar structure that benefits from the advantages described herein.

Referring now to FIGS. 2-9, wherein multiple embodiments of the tower structure 500 and the additive printing device 300 for forming the same are depicted in accordance with the present disclosure. As shown the tower structure 500 may be formed by depositing one or more layers of a wall element 502 with a printhead assembly 302. In an embodiment, the wall element 502 may circumscribe a vertical axis ($V_A$) of the tower structure 500. Each wall element 502 may for example, be one of a plurality of wall elements in an axially aligned arrangement to form the tower structure 500. As shown, the wall element 502 may generally define a hollow interior 504 that may, in a wind turbine 100, be employed to house various turbine components. In addition, as will be described in more detail below, the tower structure 500 may be formed using additive manufacturing.

Figure 2:
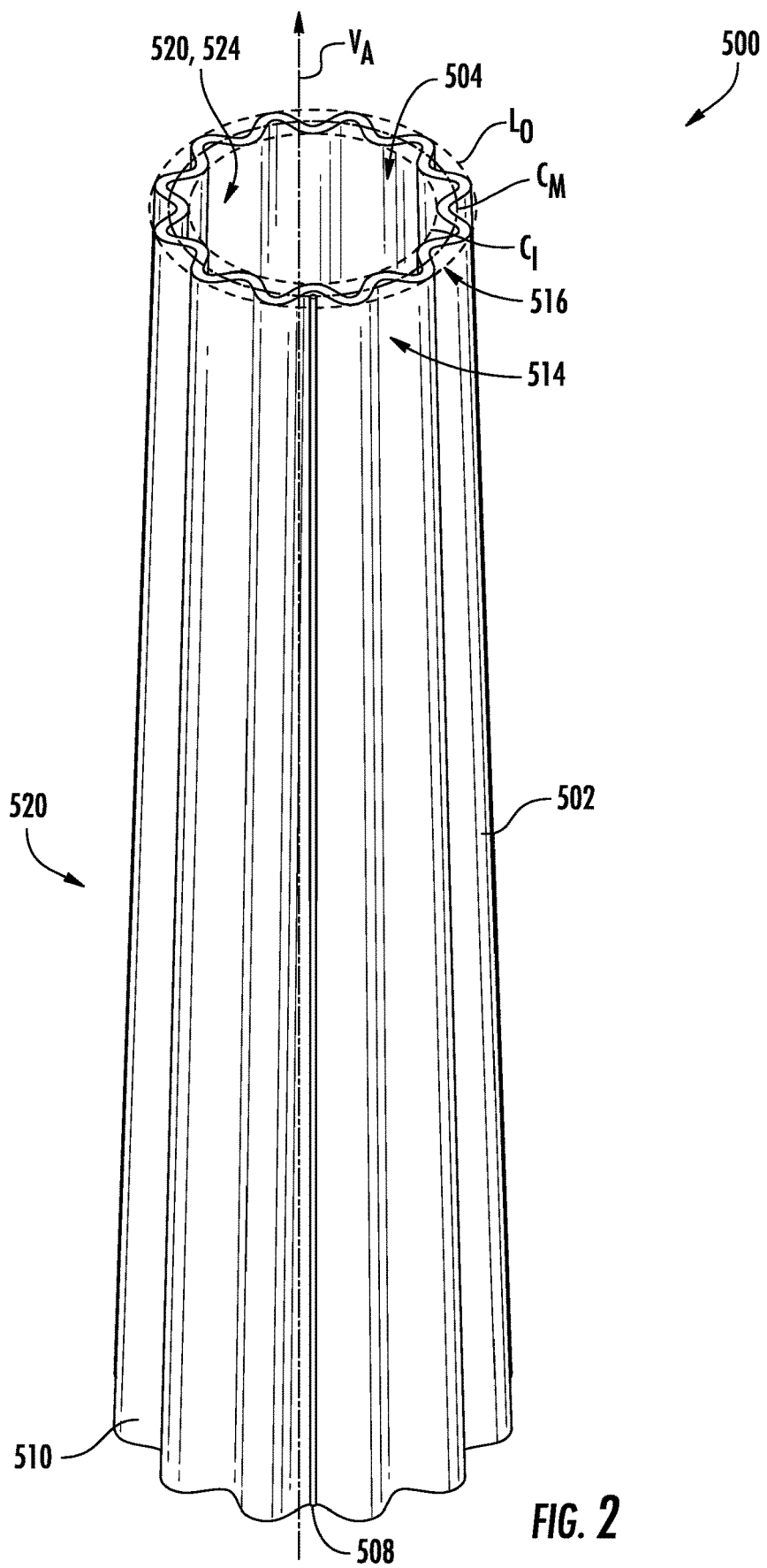
FIG. 2 illustrates a perspective view of one embodiment of a tower structure according to the present disclosure.
Figure 3:
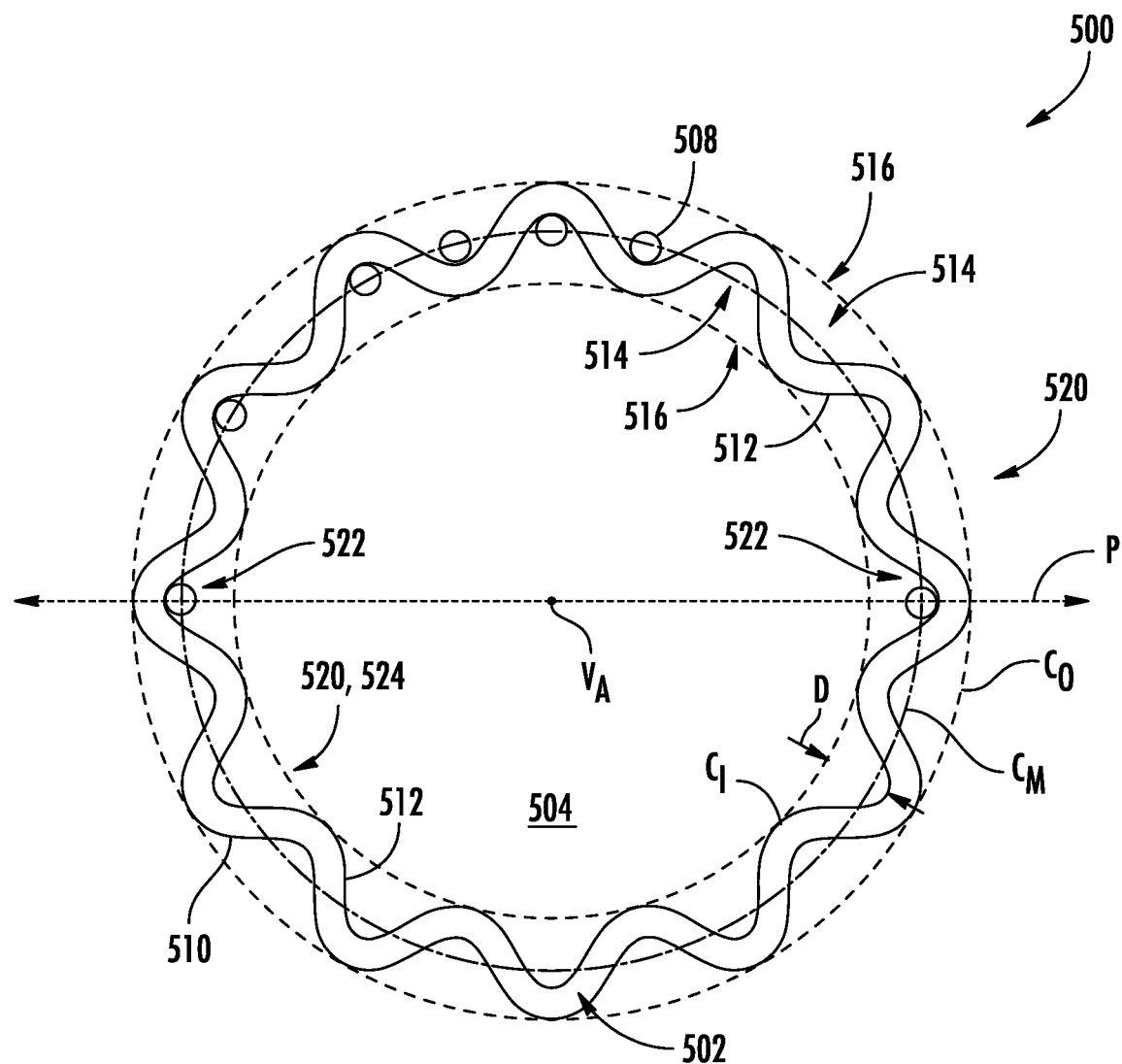
FIG. 3 illustrates a horizontal cross-sectional view of the tower structure of FIG. 2 particularly illustrating a layer of a wall element according to the present disclosure.
Figure 4:
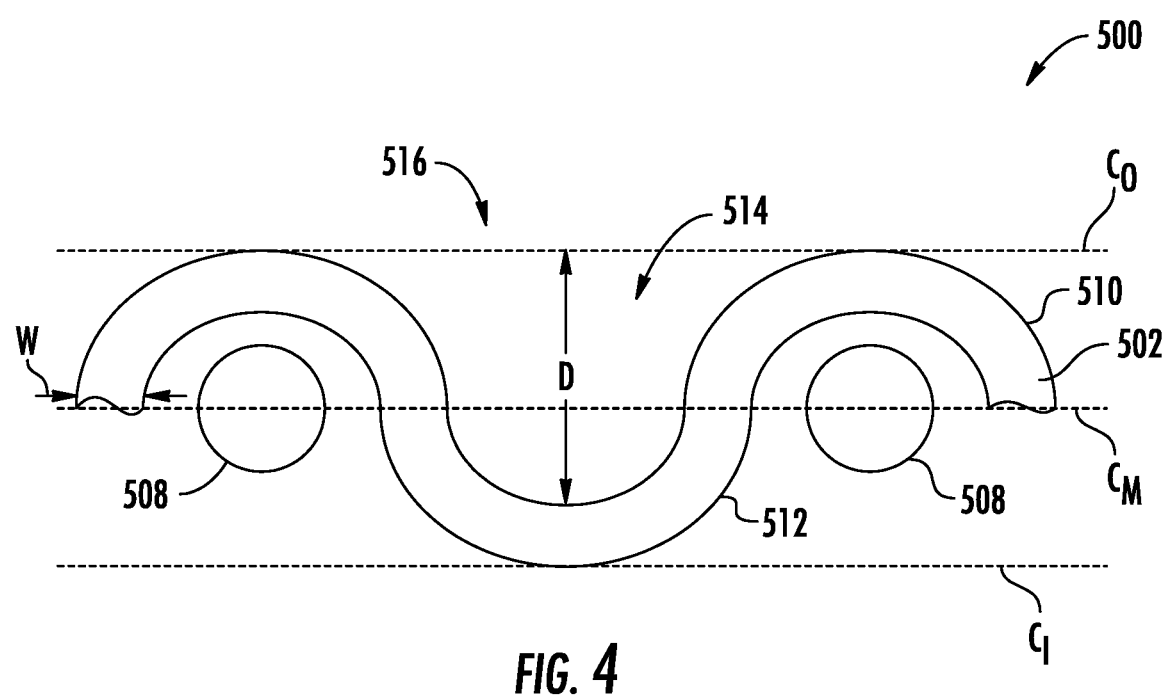
FIG. 4 illustrates an overhead view of a portion of the layer of the wall element of FIG. 3 according to the present disclosure.

In an embodiment, the tower structure 500 may be formed from at least one cementitious material 506 that is reinforced with one or more reinforcing elements 508 as illustrated in FIGS. 2-4. The reinforcing element(s) 508 may be a wire, a cable, a rod, a band, or any combination thereof. For example, in an embodiment, the reinforcing element(s) 508 may be a post-tension cable. The reinforcing element(s) 508 may be embedded in the cementitious material 506 during the printing process, as described in more detail below.

As used herein, the cementitious material 506 may include any suitable workable paste that may be configured to bind together after curing to form a structure. Suitable cementitious materials may include, for example, concrete, pitch resin, asphalt, clay, cement, mortar, cementitious compositions, or other similar materials or compositions.

Figure 5:
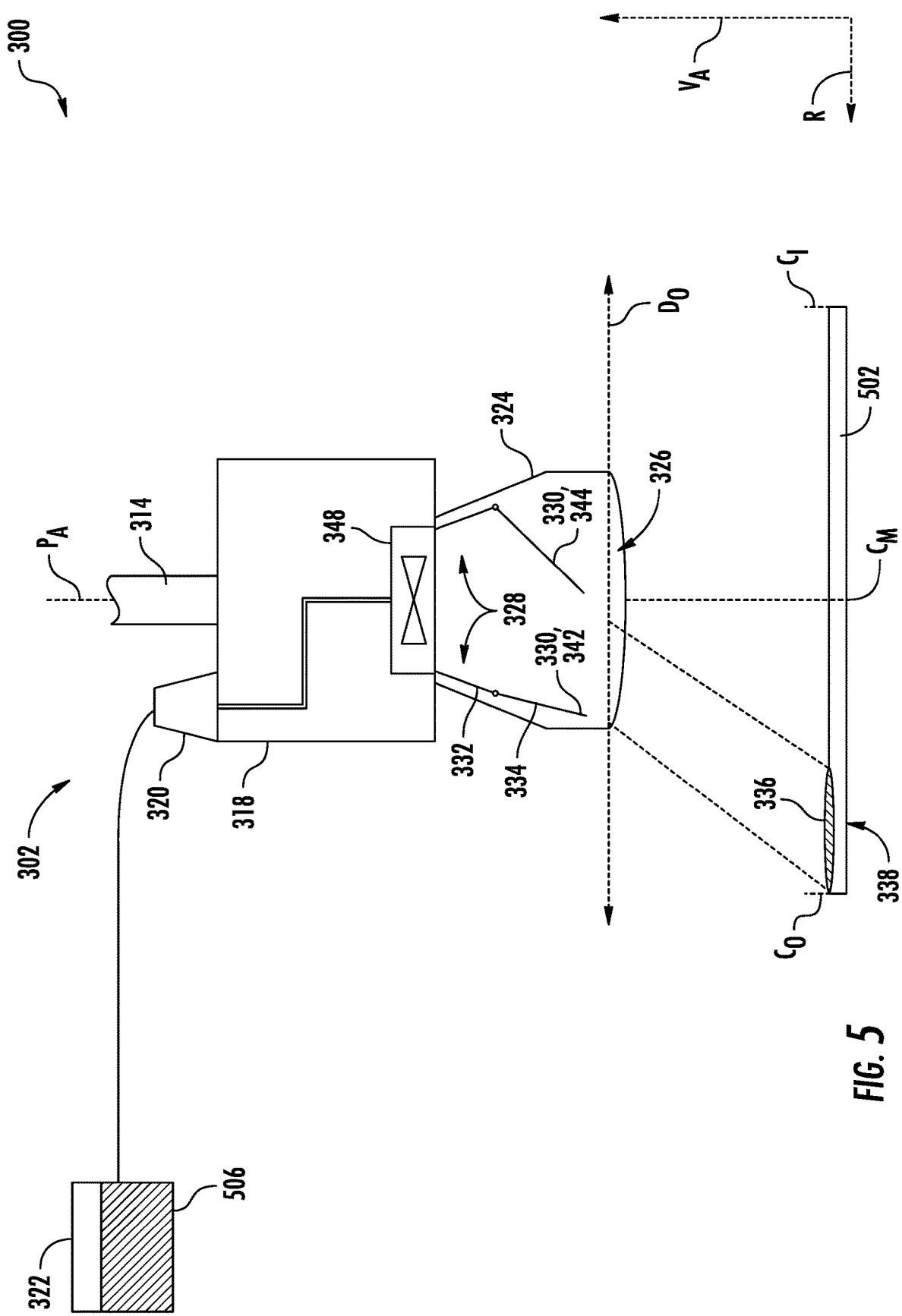
FIG. 5 illustrates a simplified cross-sectional view of one embodiment of a print head assembly of an additive printing device for additively manufacturing a tower structure according to the present disclosure.

As depicted by the horizontal cross-sectional view (e.g., layer view) of the tower 500 illustrated in FIG. 3, the wall element 502 may, in an embodiment, have an outer circumferential face 510. The outer circumferential face 510 may define an outer reference curve ($C_O$) for each layer of the tower structure 500. The outer reference curve ($C_O$) may be tangential to a portion of the outer circumferential face 510 having a maximal radial distance from the vertical axis ($V_A$). The outer reference curve ($C_O$) may, for example, be generally circular, circumscribing the vertical axis ($V_A$). It should be appreciated that the radial distance may be a distance in the radial direction (R) (FIG. 5).

In an embodiment, the wall element 502 may have an inner circumferential face 512. The inner circumferential face 512 may define an inner reference curve ($C_I$) for each layer of the tower structure 500. The inner reference curve ($C_I$) may be tangential to a portion of the inner circumferential face 512 having a minimal radial distance from the vertical axis ($V_A$). The inner reference curve ($C_O$ may, for example, be generally circular, circumscribing the vertical axis ($V_A$).

In an embodiment, a midline reference curve ($C_M$) may be defined for each layer of the tower structure 500. The midline reference curve ($C_M$) may be equidistant between the outer reference curve ($C_I$) and the inner reference curve ($C_O$ for the layer. Accordingly, the midline reference curve ($C_M$) may be generally circular, circumscribing the vertical axis ($V_A$). It should be appreciated that the midline reference curve ($C_M$) may represent a radial neutral point corresponding to the width/thickness (W) of the wall element 502. Accordingly, a force, such as from a post-tension cable, may be applied at the midline reference curve ($C_M$) without generating an unbalanced moment within the wall element 502. In other words, the loads developed radially across the wall element 502 by a compressive force applied at the midline reference curve ($C_M$) may be in equilibrium.

In order to facilitate the positioning of the reinforcing element(s) 508 at the midline reference curve ($C_M$), the wall element 502 may define at least one recess 514. In an embodiment, the recess(es) 514 may have a single, circumferential opening 516 positioned along the outer reference curve ($C_I$). In an additional embodiment, the recess(es) 514 may have a single, circumferential opening 516 positioned along the inner reference curve ($C_I$). In such an embodiment, the reinforcing element(s) 508 may be placed entirely within the recess(es) 514 at the midline reference curve ($C_M$).

As particularly illustrated by the close-up view of the portion of the horizontal cross-sectional of FIG. 3 illustrated in FIG. 4, in an embodiment, the recess(es) 514 may have a depth (D) extending in a radial direction. The depth (D) may intersect the midline reference curve ($C_M$). For example, the depth (D) may extend radially outward from the inner reference curve ($C_I$). In such an embodiment, the depth (D) may have a maximal radial distance from the vertical axis ($V_A$) which is greater than the radial distance between the vertical axis ($V_A$) and the midline reference curve ($C_M$). In an additional embodiment, the depth (D) may extend radially inward from the outer reference curve ($C_I$). In such an embodiment, the depth (D) may have a minimal radial distance from the vertical axis ($V_A$) which is less than the radial distance between the vertical axis ($V_A$) and the midline reference curve ($C_M$).

As particularly illustrated in FIGS. 2 and 3, in an embodiment, the wall element 502 may be formed with a first plurality of recesses 520. The first plurality of recesses 520 may be distributed circumferentially about the vertical axis ($V_A$). The first plurality of recesses 520 may, for example, include twelve recesses 514 distributed equidistantly along the outer reference curve ($C_I$). In an embodiment wherein the first plurality recesses 520 is distributed about the outer reference curve ($C_O$), the depth (D) of each recess may extend in a radial direction to a point inward of the midline reference curve ($C_M$) and outward of the inner reference curve ($C_O$).

As further depicted in FIGS. 2 and 3, in an embodiment, the wall element 502 may be formed with a second plurality of recesses 524. The second plurality of recesses 524 may be distributed circumferentially about the vertical axis ($V_A$). The second plurality of recesses 524 may, for example, include twelve recesses 514 distributed equidistantly along the inner reference curve ($C_I$). In an embodiment wherein the second plurality recesses 524 is distributed about the inner reference curve ($C_I$), the depth (D) of each recess may extend in a radial direction to a point outward of the midline reference curve ($C_M$) and inward of the outer reference curve ($C_O$).

It should be appreciated that, in an embodiment, the wall element 502 may include both the first plurality of recesses 520 and the second plurality of recesses 524. For example, in an embodiment, the second plurality of recesses 524 may be circumferentially offset from the first plurality of recesses 520. The circumferential offset of the second plurality recesses 502 A4 relative to the first plurality recesses 520 may, in an embodiment, form the wall element 502 as a continuously undulating form circumscribing the vertical axis ($V_A$) as depicted in FIGS. 2 and 3. It should further be appreciated that, in such an embodiment, the distance between the inner circumferential face 512 and the outer circumferential face 510 (e.g. the width (W)) may remain constant for the layer of the tower structure 500.

In an embodiment, at least one reinforcing element 508 may be placed in each of the first plurality of recesses 520 and/or the second plurality of recesses 524. Each of the reinforcing elements 508 may be positioned at the midline reference curve ($C_M$). Additionally, each reinforcing element may be positioned on a plane (P) which is parallel to the vertical axis ($V_A$). Accordingly, pairs 522 of the reinforcing elements 508 may be oriented planar with the vertical axis ($V_A$) while converging toward the vertical axis ($V_A$) in response to a tapering of the tower structure 500 corresponding to an increase in height above the support surface 104.

In an embodiment, each wall element 502 of the plurality of wall elements comprising the tower structure 500 may be rotationally offset relative to at least one adjacent wall element 502. The rotational offset between adjacent wall elements may arrange the recesses 514 defined in each of the wall elements 502 so as to form a reinforcement channel.

The reinforcement channel may, for example, have a spiral shape relative to the vertical axis ($V_A$). In an embodiment, the reinforcing element(s) 508 may be positioned within the reinforcement channel at the midline reference curve ($C_M$). The placement of the reinforcing element(s) 508 within the reinforcement channel may form a reinforcing spiral for the tower structure 500.

In an embodiment, the recess(es) 514 may, in an embodiment, be formed with a geometry which facilitates the retention of a finishing material 518, such as the cementitious material 506, at least partially within the recess(es) 514. The finishing material 518 may be applied following the positioning of the reinforcing element(s) 508 within the recess(es) 514 at the midline reference curve ($C_M$). The finishing material 518 may form an interior and/or exterior surface of the tower structure 500 having a desired surface roughness and/or other finish characteristic.

Figure 9:
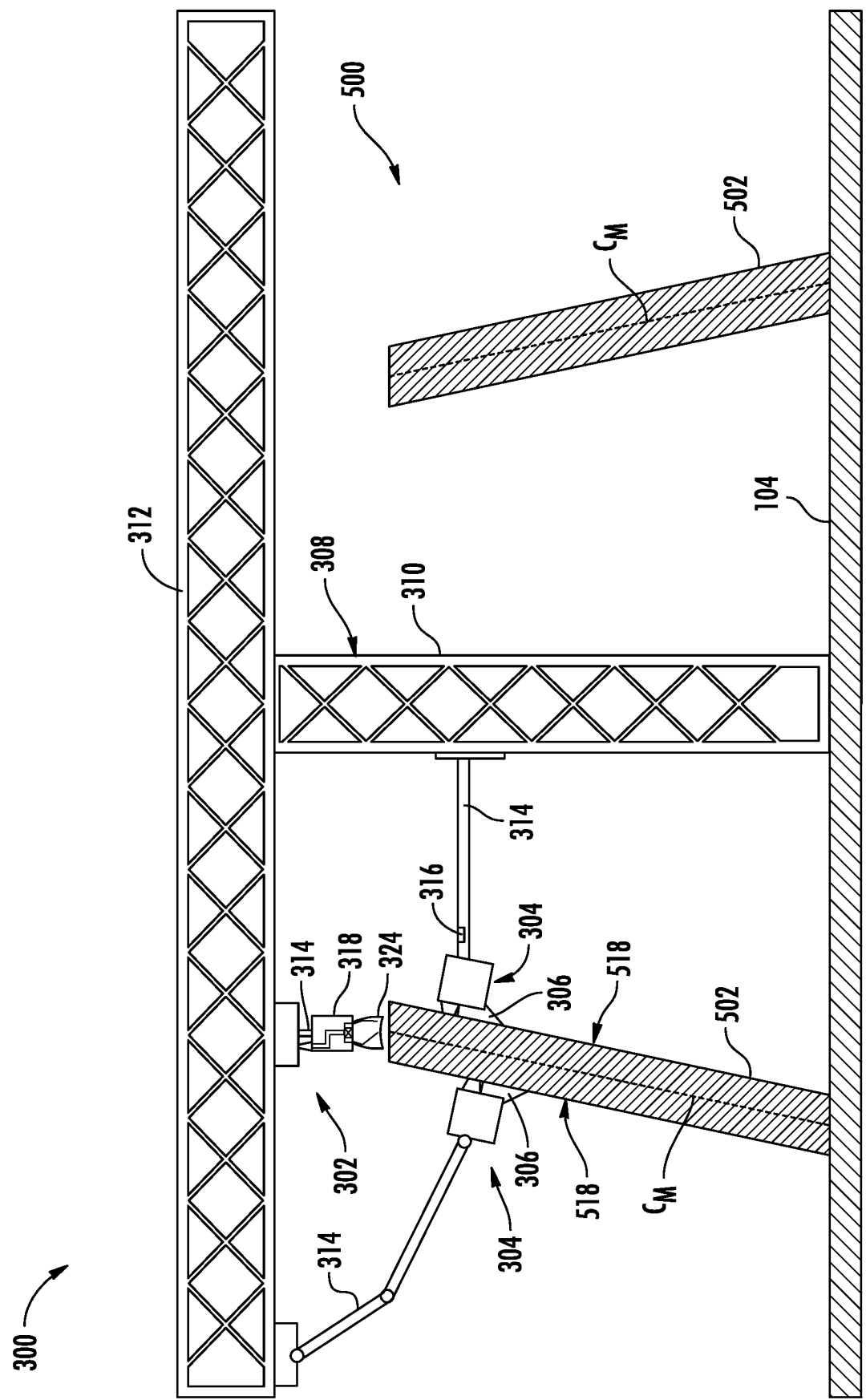
FIG. 9 illustrates a vertical cross-sectional view of one embodiment of a tower structure and an additive printing device for the manufacturer thereof according to the present disclosure.

As depicted in FIG. 9, in an embodiment, the finishing material 518 may be applied to the wall element 502 via at least a second printhead assembly 304. The second printhead assembly 304 may, for example, include an articulable forming element 306. The articulable forming element 306 may be positioned so as to provide a slip form during the curing of the finishing material 518. The articulable forming element 306 may be coupled to the second printhead assembly 304 via an articulating joint and at least one form actuator. In an embodiment, the articulable forming element 306 may be formed so as to correspond to the shape and circumference of the tower structure 500. In an alternative embodiment, the articulable forming element 306 may be adjustable in shape and size so as to correspond to the shape and circumference of the tower structure 500 in the region where the second printhead assembly 304 may be depositing the finishing material 518. In another embodiment, the articulable forming element 306 may be advanced at a rate which permits the finishing material 518 to set by the time the finishing material 518 emerges from an edge of the articulable forming element 306.

It should be appreciated that the use of a slip form may, in at least one embodiment, permit the deposition of the finishing material 518 in a continuous manner as opposed to a piecewise construction. The use of the articulable forming element 306 as a slip form may also result in the interior and/or exterior surfaces being essentially smooth. Such a finish may require little to no additional processing in order to achieve a desired finish for the tower structure 500. It should be further appreciated that the articulable forming element 306 may be constructed of a metal, a plastic, a composite, or any other material selected to provide the support for the uncured finishing material 518 as well as providing the desired surface finish as the articulable forming element 306 advances up and/or across the tower structure 500.

As particularly illustrated in FIGS. 5-9, the tower structure 500 may be additively manufactured via the additive printing device 300 according to aspects of the present disclosure. Notably, all or part of the tower structure 500, in particular, the wall element(s) 502, may be printed layer-by-layer, using the additive printing device 300. The additive printing device 300 may use any suitable means for depositing layers of additive material, such as concrete, to form the tower structure 500. Thus, aspects of the present subject matter are directed to methods for manufacturing a tower structure, such as a wind turbine tower, via additive manufacturing. Additive manufacturing, as used herein, is generally understood to encompass processes used to synthesize three-dimensional objects in which successive layers of material are formed under computer control to create the objects as such, objects of any size and/or shape can be produced from digital model data. It should be further understood that the additive manufacturing methods of the present disclosure may encompass three degrees of freedom, as well as more than three degrees of freedom, such that the printing techniques are not limited to printing stacked two-dimensional layers but are also capable of printing curved and/or irregular shapes.

As particularly depicted in FIG. 9, in an embodiment, the additive printing device 300 may include a support structure 308. The support structure 308 may extend from the ground or from the support surface 104 along a generally vertical direction. In an embodiment, the support structure 308 may include at least one vertical support component 310. As depicted in FIG. 9, the vertical support component(s) 310 may be located radially inward of the wall element 502. However, in an additional embodiment, the vertical support component(s) 310 may be located radially outward of the tower structure 500.

The vertical support component(s) 310 may, in an embodiment, support a horizontal support component 312. The vertical support component(s) 310 and the horizontal support component 312 may, in an embodiment, be a truss-like structure (e.g. similar to a tower crane) but could be formed in the other suitable manner or have any other configuration according to alternative embodiments. The horizontal support component 312 may, in an embodiment, be rotatable about the vertical support component(s) 310. In an additional embodiment, the horizontal support component 312 may be movably coupled to the vertical support component(s) 310 so as to permit the horizontal support component 312 to move in the vertical direction.

In at least one embodiment, the vertical support component(s) 310 may be configured to have a height which increases in step with the tower structure 500 during the manufacturing thereof. In such an embodiment, additional segments may be combined with the vertical support component(s) 310 so as to raise the vertical support structure using a jacking system. In general, the jacking system may be positioned proximate the support surface 104 and may be configured for raising the vertical support component(s) 310 and inserting additional segments.

The support structure 308 may be configured to support at least one support arm 314 movably coupled thereto. In at least one embodiment, the movable support arm(s) 314 may also serve as the horizontal support component 312. The support arm(s) 314 may be configured to position at least one component of the additive printing device 300 adjacent to the tower structure 500. The support arm(s) 314 may also be configured to deliver power, air, cementitious material, form material, or other resources to the supported component. In an additional embodiment, the support arm(s) 314 may also be equipped with at least one sensor 316 for detecting a position of the support arm(s) 314 relative to the tower structure 500.

As depicted in FIGS. 5-9, the additive printing device 300 may include the printhead assembly 302 supported by the support structure 308. The printhead assembly 302 may be positioned over the support surface 104 or preceding layers of the wall element 502 by at least one of the horizontal support component 312 and/or the support arm(s) 314.

The printhead assembly 302 may include a printhead 318 and may define a printhead axis ($P_A$). The printhead axis ($P_A$) may be parallel to the vertical axis ($V_A$). The printhead 318 may include a supply coupling 320. The supply coupling 320 may, in an embodiment, be configured to receive a portion of the cementitious material 506 from a material supply 322.

As depicted by the simplified cross-sectional views of FIGS. 5-9, in an embodiment, the printhead 318 may include a deposition nozzle 324. The deposition nozzle 324 may be positioned vertically between the supply coupling 320 and the wall element 502. The deposition nozzle 324 may, in an embodiment, define a deposition orifice 326.

It should be appreciated that, in an embodiment, the deposition orifice 326 may be defined by the portion of the deposition nozzle 324 which is proximal to the support surface 104. In other words, when the printhead assembly 302 is supported by the horizontal support member 312 so that the printhead axis ($P_A$) is parallel to the vertical axis ($V_A$), the deposition orifice 326 may be defined by the lowest portion of the deposition nozzle 324.

The deposition orifice 326 may be a point of departure whereby a quantity of the cementitious material 506 exits the printhead 318 for deposition onto the wall element 502. Accordingly, in an embodiment, the deposition orifice 326 may circumscribe the printhead axis ($P_A$). The deposition orifice 326 may be oriented orthogonal to the printhead axis ($P_A$). In other words, a plane ($D_O$) defined by the deposition orifice may be oriented orthogonal to the printhead axis ($P_A$).

In an embodiment, the deposition orifice 326 may be maintained in a fixed shape during the deposition of the cementitious material 506 during the additive manufacturing of the tower structure 500. Additionally, the deposition orifice 326 and the plane ($D_O$) defined thereby, may be maintained orthogonal to the printhead axis ($P_A$) during the deposition of the cementitious material 506. It should be appreciated that maintaining the deposition orifice 326 orthogonal to the printhead axis ($P_A$) during the deposition of the cementitious material may preclude the utilization of alterations in the orientation of the deposition orifice 326 to direct the flow of the cementitious material 506. In other words, the maintaining of the orthogonal orientation of the deposition orifice 326 may preclude the pitching, angling, and/or rotating of the deposition nozzle 324 during the deposition of the cementitious material 506.

Figure 6:
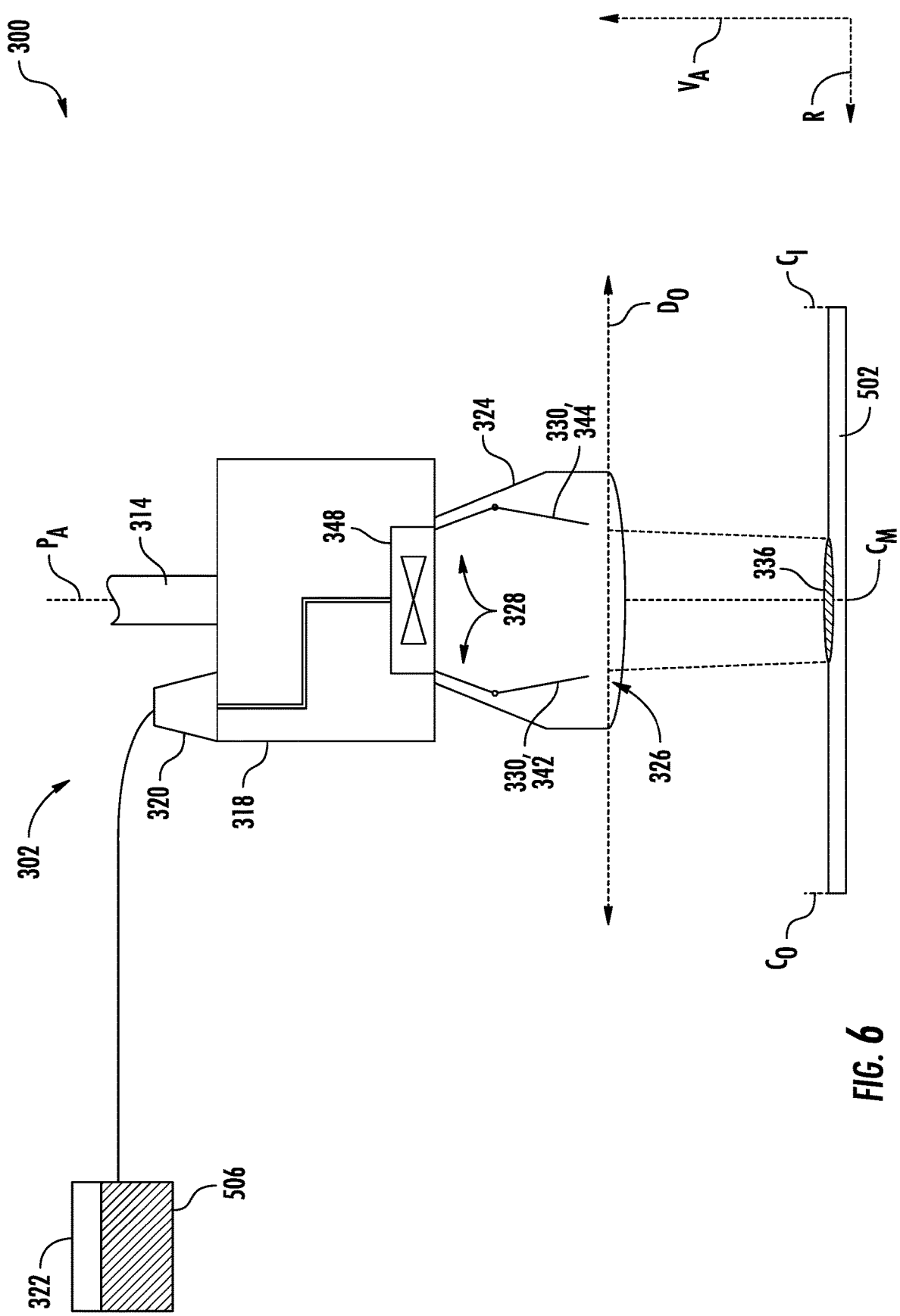
FIG. 6 illustrates a simplified cross-sectional view of one embodiment of a print head assembly of an additive printing device for additively manufacturing a tower structure according to the present disclosure.
Figure 7:
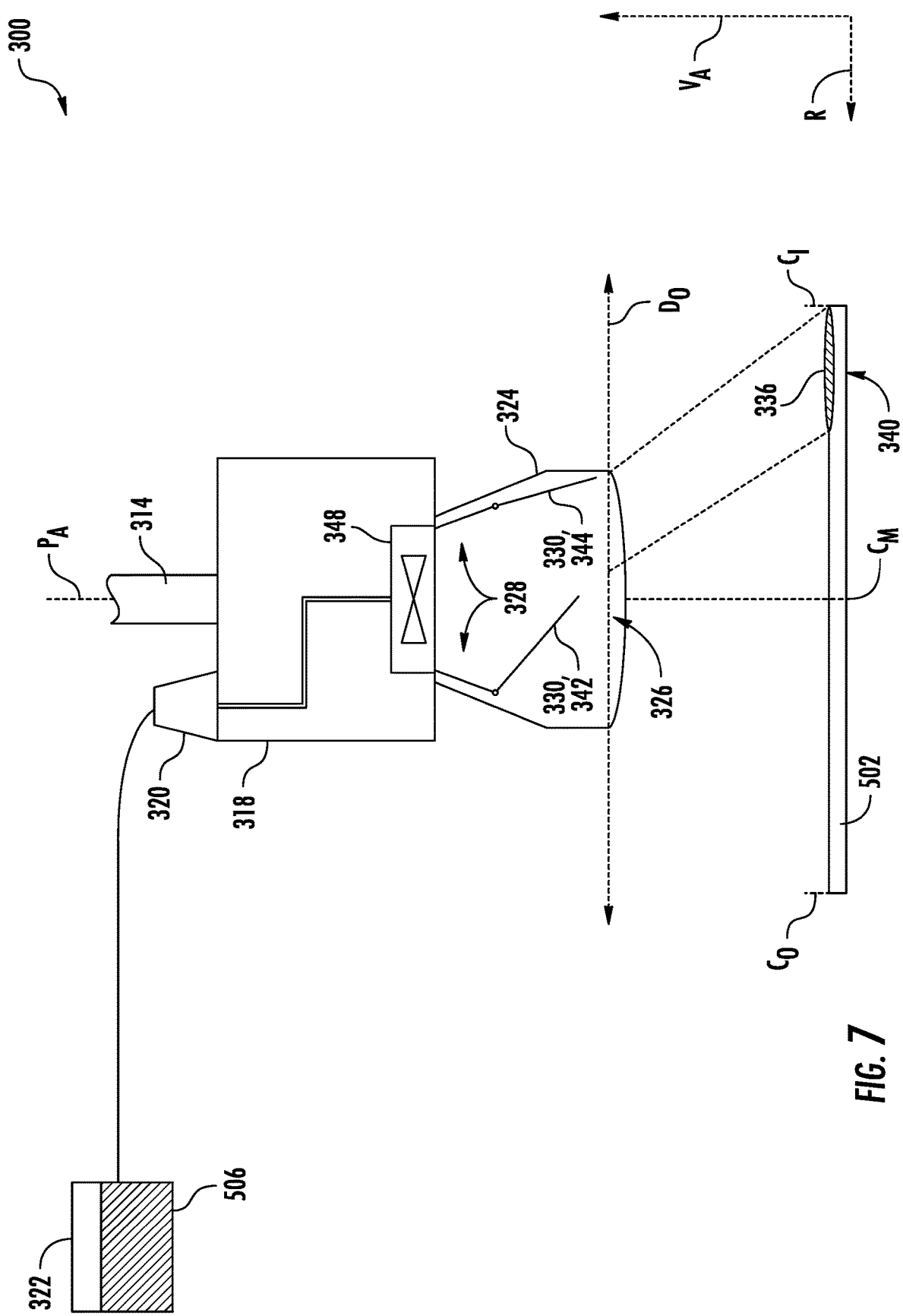
FIG. 7 illustrates a simplified cross-sectional view of one embodiment of a print head assembly of an additive printing device for additively manufacturing a tower structure according to the present disclosure.

Referring still to FIGS. 5-9, in an embodiment, the printhead 318 may include a translatable flow-directing element 328. The translatable flow-directing element 328 may be positioned within the deposition nozzle 324 between the supply coupling 320 and the deposition orifice 326. For example, such as depicted in FIGS. 5-7, the flow directing element 328 may be positioned entirely within the deposition nozzle 324. In such an embodiment, no portion of the translatable flow-directing element 328 may intersect the plane ($D_O$) defined by the deposition orifice 326. It should be appreciated that, in an embodiment, the supply coupling 320, the translatable flow-directing element 328, and the deposition orifice 326 may be serially arranged in the vertical direction.

In an embodiment, the translatable flow-directing element 328 may be configured to alter and interior shape of the deposition nozzle 324 in order to affect a flowpath of the cementitious material 506 without necessitating an alteration of the orientation of the deposition nozzle 324 (as evidenced by a change in the orientation of the deposition orifice 326). For example, the flow of the cementitious material 506 through the deposition nozzle 324 may follow a nominal flowpath when the interior shape of the deposition nozzle 324 has an unaltered shape. However, in an embodiment, the translatable flow-directing element 328 may alter the interior shape of the deposition nozzle 324 resulting in the flow of the cementitious material 506 following an altered flowpath which deviates from the nominal flowpath while the deposition orifice 326 is maintained in a fixed orientation (e.g., orthogonal to the printhead axis ($P_A$)). It should be appreciated that, in an embodiment, the translatable flow-directing element 328 may be integrally formed with the deposition nozzle 324.

In various embodiments, the translatable flow-directing element 328 may include a plurality of flaps 330. As used herein, the term "flap" may include suitable translatable (e.g., hinged or otherwise movable) structures such as plates, vanes, inflatable elements, bimetallic strips, and/or other similar structures configured to direct the deposition of the cementitious material 506 via the alteration of the interior shape of the deposition nozzle 324. The plurality of flaps 330 may, in an embodiment, be formed from a metal, a plastic, and/or a composite. As depicted in FIGS. 5-9, in an embodiment, each the plurality of flaps 330 may include a fixed portion 332 and at least one movable portion 334 movably coupled thereto. For example, a hinge, a pivot, and/or a flexible portion may be disposed between each fixed portion 332 and the corresponding movable portion(s) 334 disposed between.

In an embodiment, the plurality of flaps 330 of the translatable flow-directing element 328 may include an outer flap 342 positioned radially outward of the midline reference curve ($C_M$). Additionally, the plurality of flaps 330 may include an inner flap 344 positioned radially inward of the midline reference curve ($C_M$).

Figure 8:
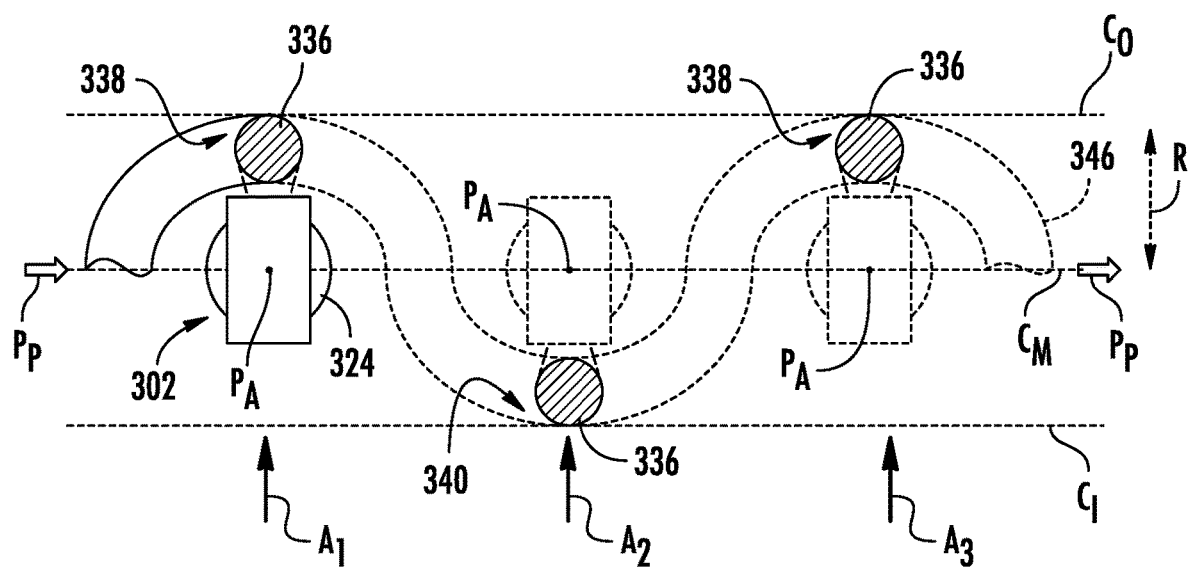
FIG. 8 illustrates an overhead view of a portion of the layer of the wall element of FIG. 3 particularly illustrating a print path for the additive manufacturing of the portion according to the present disclosure.

As particularly depicted in FIGS. 5-8, employing the printhead 318 to form the wall element 502 may include establishing a fixed print path (as represented in FIG. 8 by arrows (Pp)) for the printhead 318. As depicted in FIG. 8, in operation the printhead assembly 302 may progress along the fixed print path from position $A_1$ to position $A_2$, $A_3$, etc. until the layer of the wall element 302 has been deposited.

In an embodiment, the fixed print path may be established by aligning the printhead axis ($P_A$) with the midline reference curve ($C_M$). In an embodiment, the printhead axis ($P_A$) may remain aligned and parallel with the midline reference curve ($C_M$) during the deposition of the cementitious material 506. In other words, the printhead axis ($P_A$) may remain aligned and parallel with the midline reference curve ($C_M$) during the printing operation of the wall element 502. It should be appreciated that, insofar as the printhead axis ($P_A$) may remain aligned parallel with the midline reference curve ($C_M$) throughout the print operation and the orientation of the deposition orifice 326 is dependent on the orientation of the printhead axis ($P_A$), the orientation of the deposition orifice 326 may thus remain fixed throughout the print operation.

With the printhead axis ($P_A$) aligned with and parallel to the midline reference curve ($C_M$) throughout the print operation, depositing one or more layers of the wall element 502 may include establishing a deposition footprint 336 of the cementitious material 506. As depicted in FIGS. 5, 7, and 8, the deposition footprint 336 may be established at various radial positions which are offset from the midline reference curve ($C_M$) as the printhead assembly 302 is progressed along the fixed print path circumscribing the vertical axis ($V_A$). In an embodiment, the establishment (e.g., the positioning) of the deposition footprint 336 may be accomplished via the translatable flow-directing element 328.

In an embodiment, the various radial positions may include a plurality of first radial positions 338. The plurality of first radial positions 338 may be in contact with the outer reference curve ($C_I$). Additionally, the various radial positions may include a plurality of second radial positions 340. The plurality of second radial positions 340 may be in contact with the inner reference curve ($C_I$).

As depicted in FIG. 5, in order to deposit the layer(s) of the wall element 502, in an embodiment, the outer flap 342 and the inner flap 344 of the translatable flow-directing element 328 may be oriented to establish the deposition footprint 336 at 1 of the plurality of first radial positions 338. In such an embodiment, the inner and outer flaps 342, 344 may be reoriented as depicted in FIG. 6 to transition the radial location of the deposition footprint 336 in the direction of the inner reference curve ($C_I$). Accordingly, as depicted in FIG. 7, the reorienting of the inner and outer flaps 342, 344 may facilitate the establishment of the deposition footprint 336 at one of the plurality of second radial positions 340 in contact with the inner reference curve ($C_I$). It should be appreciated that progressing the printhead 318 along the fixed print path may, as depicted in FIG. 8, establish a deposition path 346 between the radial positions of the first and second pluralities of radial positions 338, 340 via the orienting and reorienting of the inner and outer flaps 342, 344.

As particularly depicted in FIG. 8, in an embodiment, the orienting and reorienting of the inner and outer flaps 342, 344 may be synchronized. The synchronizing of the movement of the inner and outer flaps 342, 344 may establish a fixed cross-sectional area of the deposition footprint 336. The fixed cross-sectional area may have a constant value (e.g. magnitude) along the entirety of the deposition path 346. It should be appreciated that the cross-sectional area of the deposition footprint 336 may correspond to a portion of the wall element 502 upon which the cementitious material 506 may be deposited at any given instant.

In an additional embodiment, at least one of the inner and outer flaps 342, 344 may be adjusted to develop a deviation in the cross-sectional area of the deposition footprint 336 at a first position along the deposition path 346 relative to a second position along the deposition path. In such an embodiment, the flow rate of the cementitious material 506 may be affected to ensure a volume of the cementitious material 506 of the deposition footprint 336 has a constant magnitude along the entirety of the deposition path 346. By affecting the flow rate of the cementitious material 506, the volume of the cementitious material 506 of each deposition footprint 336 may have constant magnitude regardless of the cross-sectional area of the deposition footprint 336. It should be appreciated that the deviations in the cross-sectional area of the deposition footprint 336 may facilitate the formation of portions of the wall element 502 which has a varying width. It should be further appreciated that maintaining a constant volume for each deposition footprint 336 may ensure facilitate the formation of layers having a relatively constant vertical thickness.

In an embodiment, the printhead 318 may also include a flow regulator 348. The flow regulator 348 may be operably coupled between the translatable flow-directing element 328 and the supply coupling 320. Accordingly, the flow regulator 348 may be operably coupled between the inner and outer flaps 342, 344 and the supply coupling 320. The flow regulator 348 may be configured to affect a flow rate of the cementitious material 506 through the midline reference curve ($C_M$) and to the deposition orifice 326. As such, the flow regulator 348 may, in an embodiment, affect the volume of the cementitious material 506 which deposited in the deposition footprint 336 at any given instant.

Figure 10:
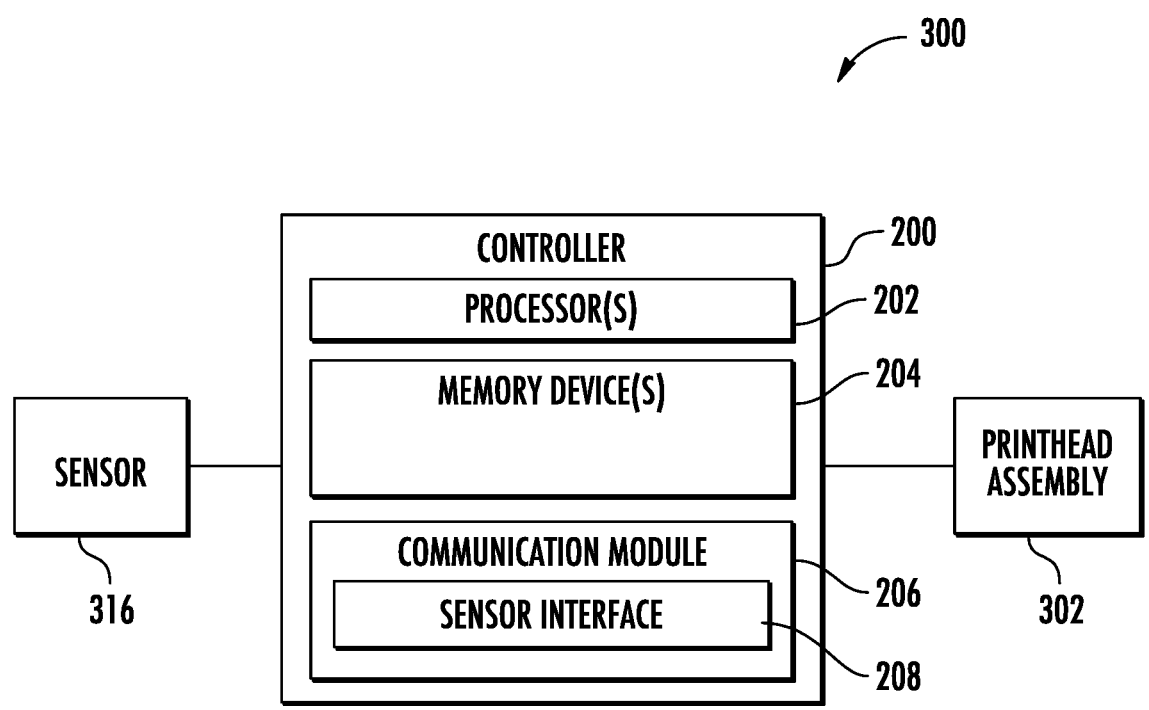
FIG. 10 illustrates a schematic diagram of a controller for use with the additive printing device according to the present disclosure.

As shown particularly in FIG. 10, a schematic diagram of one embodiment of suitable components of a controller 200 that may control the additive printing device 300 is illustrated. For example, as shown, the controller 200 may include one or more processor(s) 202 and associated memory device(s) 204 configured to perform a variety of computer-implemented functions (e.g., performing the methods, steps, calculations and the like and storing relevant data as disclosed herein). Additionally, the controller 200 may also include a communications module 206 to facilitate communications between the controller 200 and the various components of the additive printing device 300. Further, the communications module 206 may include a sensor interface 208 (e.g., one or more analog-to-digital converters) to permit signals transmitted from one or more sensors 316 to be converted into signals that can be understood and processed by the processors 202. It should be appreciated that the sensor(s) 316 may be communicatively coupled to the communications module 206 using any suitable means, such as a wired or a wireless connection. Additionally, the communications module 206 may also be operably coupled to a component of the additive printing device 300 so as to orchestrate the formation of the tower structure 500.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 204 may generally be configured to store suitable computer-readable instructions that, when implemented by the processor(s) 202, configure the controller 200 to perform various functions including, but not limited to, manufacturing a tower structure, as described herein, as well as various other suitable computer-implemented functions.

Figure 11:
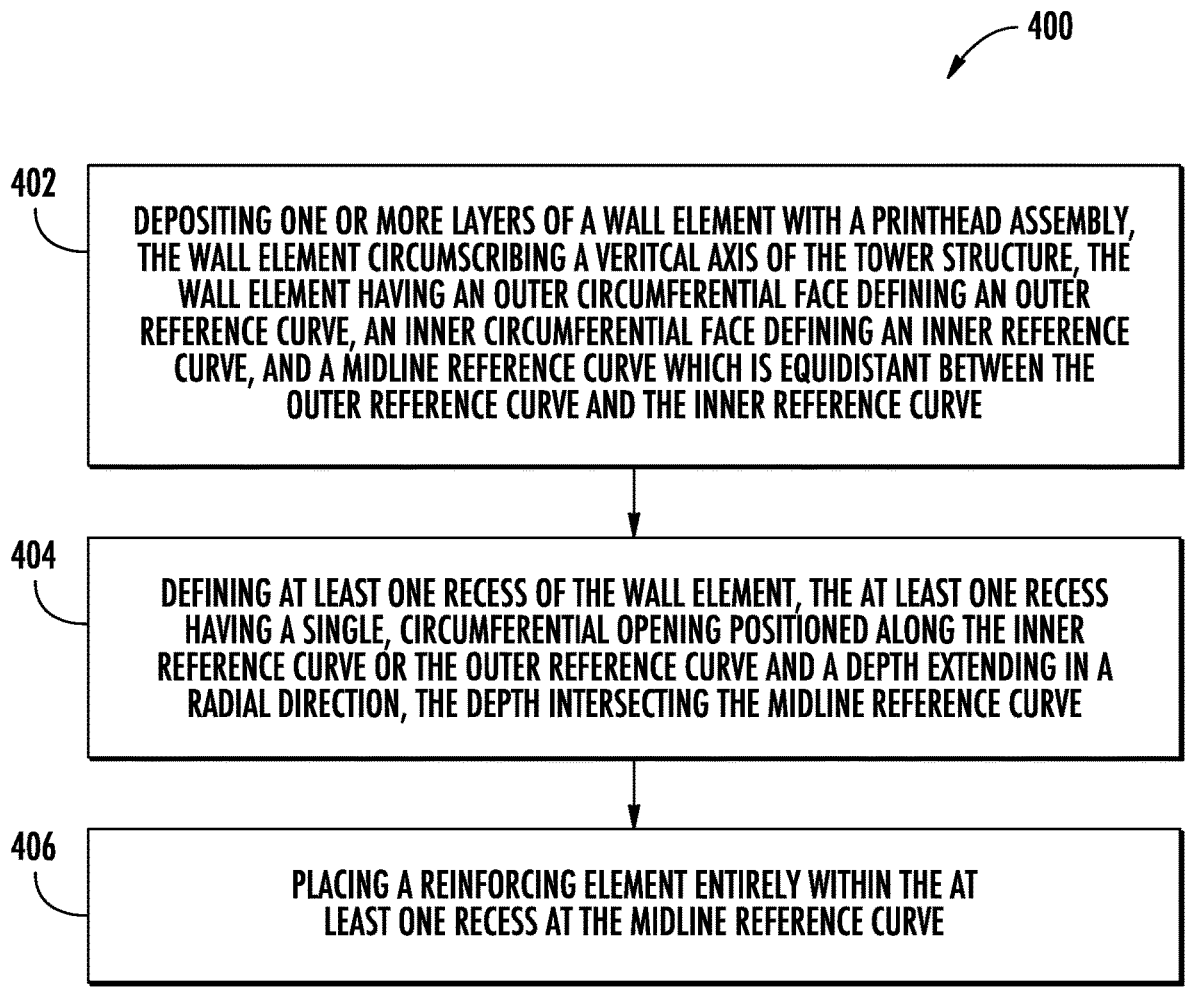
FIG. 11 illustrates a flow diagram of one embodiment of a method for manufacturing a tower structure according to the present disclosure.

Referring now to FIG. 11, a flow diagram of one embodiment of a method 400 for manufacturing a tower structure is presented. The method 400 may be implemented using, for instance, the additive printing device 300 of the present disclosure discussed above with references to FIGS. 1-10 to manufacture of the tower structure. FIG. 11 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 may include depositing one or more layers of a wall element with a printhead assembly. The wall element may circumscribe a vertical axis of the tower structure. The wall element may have an outer circumferential face defining an outer reference curve, an inner circumferential face defining an inner reference curve, and a midline reference curve which is equidistant between the outer reference curve and the inner reference curve. As shown at (404), the method 400 may include defining at least one recess of the wall element. The at least one recess may have a single, circumferential opening positioned along the inner reference curve or the outer reference curve and a depth extending in a radial direction. The depth may intersect the midline reference curve. Additionally, as shown at (406), the method 400 may include placing a reinforcing element entirely within the at least one recess at the midline reference curve.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method of manufacturing a tower structure, the method comprising: depositing one or more layers of a wall element with a printhead assembly, the wall element circumscribing a vertical axis of the tower structure, the wall element having an outer circumferential face defining an outer reference curve, an inner circumferential face defining an inner reference curve, and a midline reference curve which is equidistant between the outer reference curve and the inner reference curve; defining at least one recess of the wall element, the at least one recess having a single, circumferential opening positioned along the inner reference curve or the outer reference curve and a depth extending in a radial direction, the depth intersecting the midline reference curve; and placing a reinforcing element entirely within the at least one recess at the midline reference curve.

Clause 2. The method of clause 1, wherein the printhead assembly comprises a printhead and defines a printhead axis which is parallel to the vertical axis, the printhead comprising a supply coupling, a deposition nozzle, and a translatable flow-directing element, the deposition nozzle defining a deposition orifice which circumscribes the printhead axis and is oriented orthogonal thereto, and wherein depositing one or more layers of the wall element further comprises: receiving, via the supply coupling, a portion of a cementitious material from a material supply; establishing a fixed print path for the printhead by aligning the printhead axis with the midline reference curve, wherein the printhead axis remains aligned with the midline reference curve and parallel with the vertical axis during the deposition of the cementitious material; maintaining the deposition orifice in a fixed shape and orthogonal to the printhead axis during the deposition of the cementitious material; and establishing a deposition footprint of the cementitious material at at least one radial position which is offset from the midline reference curve via the translatable flow-directing element positioned within the deposition nozzle between the supply coupling and the deposition orifice.

Clause 3. The method of any preceding clause, wherein the translatable flow-directing element further comprises an outer flap positioned radially outward of the midline reference curve, and an inner flap positioned radially inward of the midline reference curve, wherein the at least one radial position comprises a plurality of first radial positions in contact with the outer reference curve, and wherein depositing the one or more layers of the wall element further comprises: orienting the outer flap and the inner flap to establish the deposition footprint at one of the plurality of first radial positions; reorienting the inner and outer flaps to establish the deposition footprint at one of a plurality of second radial positions in contact with the inner reference curve; and progressing the printhead along the fixed print path to establish a deposition path between the radial positions of the first and second pluralities of radial positions via the orienting and reorienting of the inner and outer flaps.

Clause 4. The method of any preceding clause, wherein establishing the deposition path between the radial positions further comprises: synchronizing a movement of the outer and inner flaps so as to establish a fixed cross-sectional area of the deposition footprint, the fixed cross-sectional area having a constant value along an entirety of the deposition path.

Clause 5. The method of any preceding clause, wherein the printhead further comprises a flow regulator operably coupled between the inner and outer flaps and the supply coupling, and wherein establishing the deposition path between the radial positions further comprises: adjusting at least one of the inner and outer flaps to develop a deviation in a cross-sectional area of the deposition footprint at a first position along the deposition path relative to a second position along the deposition path; and affecting a flow of the cementitious material to ensure a volume of the cementitious material of the deposition footprint has a constant magnitude along an entirety of the deposition path regardless of the cross-sectional area.

Clause 6. The method of any preceding clause, wherein defining the at least one recess further comprises: forming a first plurality of recesses defined by the wall element and distributed circumferentially about the vertical axis.

Clause 7. The method of any preceding clause, wherein placing the reinforcing element entirely within the at least one recess further comprises: placing at least one reinforcing element in each of the first plurality of recesses; and positioning each of the at least one reinforcing elements at the midline reference curve and on a plane which is parallel to the vertical axis.

Clause 8. The method of any preceding clause, wherein forming the first plurality of recesses further comprises: distributing each circumferential opening of the recesses of the first plurality of recesses circumferentially along the outer reference curve, wherein a depth of each recess of the first plurality of recesses extends in a radial direction to a point inward of the midline reference curve and outward of the inner reference curve; forming a second plurality of recesses defined by the wall element and distributed circumferentially about the vertical axis; and distributing each circumferential opening of the recesses of the second plurality recesses circumferentially along the inner reference curve, wherein the depth of each recess of the second plurality of recesses extends in a radial direction to a point outward of the midline reference curve and inward of the outer reference curve.

Clause 9. The method of any preceding clause, wherein forming the second plurality of recesses further comprises: circumferentially offsetting the second plurality of recesses relative to the first plurality of recesses; and forming the wall element as a continuously undulating form circumscribing the vertical axis.

Clause 10. The method of any preceding clause, wherein the wall element is a one of a plurality of wall elements, and wherein depositing the one or more layers of the wall element with the printhead assembly further comprises: depositing each wall element of the plurality of wall elements in an axially aligned arrangement so as to form the tower structure; and establishing a rotational offset for each wall element of the plurality of wall elements relative to at least one adjacent wall element so that the at least one recess defined in each of the wall elements of the plurality wall elements form a reinforcing channel which has a spiral shape relative to the vertical axis.

Clause 11. The method of any preceding clause, wherein placing the reinforcing element entirely within the at least one recess further comprises: forming a reinforcing spiral via the placement of the reinforcing element entirely within the reinforcing channel.

Clause 12. An additively-manufactured tower structure, the tower structure comprising: a wall element circumscribing a vertical axis of the tower structure, the wall element having an outer circumferential face defining an outer reference curve, an inner circumferential face defining an inner reference curve, and a midline reference curve which is equidistant between the outer reference curve and the inner reference curve; at least one recess defined by the wall element, the at least one recess having a single, circumferential opening positioned along the inner reference curve or the outer reference curve and a depth extending in a radial direction, the depth intersecting the midline reference curve; and a reinforcing element placed entirely within the at least one recess at the midline reference curve.

Clause 13. The tower structure of any preceding clause, wherein the at least one recess is one of a first plurality of recesses defined by the wall element and distributed circumferentially about the vertical axis.

Clause 14. The tower structure of any preceding clause, wherein each circumferential opening of the recesses of the first plurality recesses is circumferentially distributed along the outer reference curve, wherein a depth of each recess of the first plurality of recesses extends in a radial direction to a point inward of the midline reference curve and outward of the inner reference curve, the structure further comprising: a second plurality of recesses, wherein each recess of the second plurality recesses has a circumferential opening positioned along the inner reference curve and a depth extending in a radial direction to a point outward of the midline reference curve and inward of the outer reference curve.

Clause 15. The tower structure of any preceding clause, wherein the second plurality of recesses is circumferentially offset from the first plurality of recesses.

Clause 16. The tower structure of any preceding clause, wherein the wall element has a continuously undulating form circumscribing the vertical axis.

Clause 17. The tower structure of any preceding clause, wherein the wall element is one of a plurality of wall elements, and wherein the plurality of wall elements are axially aligned about the vertical axis so as to form the tower structure.

Clause 18. An additive printing device for manufacturing a tower structure, the tower structure comprising a wall element circumscribing a vertical axis of the tower structure, the wall element having an outer circumferential face defining an outer reference curve, an inner circumferential face defining an inner reference curve, and a midline reference curve which is equidistant between the outer reference curve and the inner reference curve, the additive printing device comprising: a support structure; a material supply assembly; and a printhead assembly operably coupled to the support structure, the printhead assembly defining a printhead axis which is parallel to the vertical axis, wherein the printhead axis is aligned with the midline reference curve during the additive printing of the wall element, the printhead assembly comprising a printhead configured to deposit one or more layers of the wall element, wherein the printhead comprises: a supply coupling operably coupling the printhead to the material supply for the receipt of a cementitious material therefrom, a deposition nozzle defining a deposition orifice, the deposition orifice circumscribing the printhead axis, the deposition orifice being oriented orthogonal to the printhead axis, wherein the deposition orifice has a fixed shape and a fixed print path centered on the midline reference curve when employed to additively print the tower structure, and a translatable flow-directing element positioned within the deposition nozzle between the supply coupling and the deposition orifice, wherein the translatable flow-directing element facilitates the establishment of a deposition footprint of the cementitious material while the position of the deposition orifice is maintained orthogonal to the printhead axis and centered on the midline reference curve, the deposition footprint being established at at least one radial position which is offset from the midline reference curve.

Clause 19. The additive printing device of any preceding clause, wherein the translatable flow-directing element further comprises: an outer flap positioned radially outward of the midline reference curve; and an inner flap positioned radially inward of the midline reference curve, wherein a movement of the outer flap and the inner flap are synchronized so as to maintain a constant cross-sectional area of the deposition footprint regardless of the radial position of the deposition footprint.

Clause 20. The additive printing device of any preceding clause, wherein the translatable flow directing element further comprises: an outer flap positioned radially outward of the midline reference curve; and an inner flap positioned radially inward of the midline reference curve, wherein a movement of at least one of the outer flap and the inner flap may establish a cross-sectional area of the deposition footprint; and a flow regulator operably coupled between the inner and outer flaps and the supply coupling, the flow regulator being configured to affect a flow of the cementitious material to ensure a volume of the cementitious material of the deposition footprint has a constant magnitude regardless the radial position and cross-sectional area of the deposition footprint.

What is claimed is:

1. A method of manufacturing a tower structure, the method comprising:
    depositing one or more layers of a wall element with a printhead assembly, the wall element circumscribing a vertical axis of the tower structure, the wall element having an outer circumferential face defining an outer reference curve, an inner circumferential face defining an inner reference curve, and a midline reference curve which is equidistant between the outer reference curve and the inner reference curve;
    defining at least one recess of the wall element, the at least one recess having a single, circumferential opening positioned along the inner reference curve or the outer reference curve and a depth extending in a radial direction, the depth intersecting the midline reference curve; and
    placing a reinforcing element entirely within the at least one recess at the midline reference curve.

2. The method of claim 1, wherein the printhead assembly comprises a printhead and defines a printhead axis which is parallel to the vertical axis, the printhead comprising a supply coupling, a deposition nozzle, and a translatable flow-directing element, the deposition nozzle defining a deposition orifice which circumscribes the printhead axis and is oriented orthogonal thereto, and wherein depositing one or more layers of the wall element further comprises:
    receiving, via the supply coupling, a portion of a cementitious material from a material supply;
    establishing a fixed print path for the printhead by aligning the printhead axis with the midline reference curve, wherein the printhead axis remains aligned with the midline reference curve and parallel with the vertical axis during the deposition of the cementitious material;
    maintaining the deposition orifice in a fixed shape and orthogonal to the printhead axis during the deposition of the cementitious material; and
    establishing a deposition footprint of the cementitious material at at least one radial position which is offset from the midline reference curve via the translatable flow-directing element positioned within the deposition nozzle between the supply coupling and the deposition orifice.

3. The method of claim 2, wherein the translatable flow-directing element further comprises an outer flap positioned radially outward of the midline reference curve, and an inner flap positioned radially inward of the midline reference curve, wherein the at least one radial position comprises a plurality of first radial positions in contact with the outer reference curve, and wherein depositing the one or more layers of the wall element further comprises:
    orienting the outer flap and the inner flap to establish the deposition footprint at one of the plurality of first radial positions;
    reorienting the inner and outer flaps to establish the deposition footprint at one of a plurality of second radial positions in contact with the inner reference curve; and
    progressing the printhead along the fixed print path to establish a deposition path between the radial positions of the first and second pluralities of radial positions via the orienting and reorienting of the inner and outer flaps.

4. The method of claim 3, wherein establishing the deposition path between the radial positions further comprises:
    synchronizing a movement of the outer and inner flaps so as to establish a fixed cross-sectional area of the deposition footprint, the fixed cross-sectional area having a constant value along an entirety of the deposition path.

5. The method of claim 3, wherein the printhead further comprises a flow regulator operably coupled between the inner and outer flaps and the supply coupling, and wherein establishing the deposition path between the radial positions further comprises:
    adjusting at least one of the inner and outer flaps to develop a deviation in a cross-sectional area of the deposition footprint at a first position along the deposition path relative to a second position along the deposition path; and affecting a flow of the cementitious material to ensure a volume of the cementitious material of the deposition footprint has a constant magnitude along an entirety of the deposition path regardless of the cross-sectional area.

6. The method of claim 1, wherein defining the at least one recess further comprises:

forming a first, plurality of recesses defined by the wall element and distributed circumferentially about the vertical axis.

7. The method of claim 6, wherein placing the reinforcing element entirely within the at least one recess further comprises:

placing at least one reinforcing element in each of the first plurality of recesses; and positioning each of the at least one reinforcing elements at the midline reference curve and on a plane which is parallel to the vertical axis.

8. The method of claim 6, wherein forming the first plurality of recesses further comprises:

distributing each circumferential opening of the recesses of the first plurality of recesses circumferentially along the outer reference curve, wherein a depth of each recess of the first plurality of recesses extends in a radial direction to a point inward of the midline reference curve and outward of the inner reference curve;

forming a second plurality of recesses defined by the wall element and distributed circumferentially about the vertical axis; and distributing each circumferential opening of the recesses of the second plurality recesses circumferentially along the inner reference curve, wherein the depth of each recess of the second plurality of recesses extends in a radial direction to a point outward of the midline reference curve and inward of the outer reference curve.

9. The method of claim 8, wherein forming the second plurality of recesses further comprises:

circumferentially offsetting the second plurality of recesses relative to the first plurality of recesses; and forming the wall element as a continuously undulating form circumscribing the vertical axis.

10. The method of claim 1, wherein the wall element is a one of a plurality of wall elements, and wherein depositing the one or more layers of the wall element with the printhead assembly further comprises:

depositing each wall element of the plurality of wall elements in an axially aligned arrangement so as to form the tower structure; and establishing a rotational offset for each wall element of the plurality of wall elements relative to at least one adjacent wall element so that the at least one recess defined in each of the wall elements of the plurality wall elements form a reinforcing channel which has a spiral shape relative to the vertical axis.

11. The method of claim 10, wherein placing the reinforcing element entirely within the at least one recess further comprises:

forming a reinforcing spiral via the placement of the reinforcing element entirely within the reinforcing channel.

\* \* \* \* \*